United States Patent [19]

Friedline

[11] 4,350,463
[45] Sep. 21, 1982

[54] ARRANGEMENT FOR MOUNTING A CUTTER

[75] Inventor: Ernest J. Friedline, Latrobe, Pa.

[73] Assignee: Kennametal Inc., Latrobe, Pa.

[21] Appl. No.: 132,381

[22] Filed: Mar. 21, 1980

Related U.S. Application Data

[63] Continuation of Ser. No. 242, Jan. 2, 1979, which is a continuation of Ser. No. 805,916, Jun. 13, 1977, abandoned.

[51] Int. Cl.$^3$ .................. B23B 31/00; B23C 5/26
[52] U.S. Cl. ........................... 409/234; 279/2 R; 279/66; 408/240
[58] Field of Search ............... 409/232, 233, 234; 408/231, 239, 240, 239 A; 279/2 R, 66, 69, 70, 75, 76; 407/34

[56] References Cited

U.S. PATENT DOCUMENTS

| | | | |
|---|---|---|---|
| 2,967,462 | 1/1961 | Yogus | 409/232 |
| 3,219,355 | 11/1965 | Fujinuma | 279/75 |
| 3,498,653 | 3/1970 | McCreery | |
| 3,672,784 | 6/1972 | McCreery | |
| 4,018,112 | 4/1977 | Heaton et al. | |
| 4,135,418 | 1/1979 | McCray et al. | 409/239 |
| 4,197,771 | 4/1980 | Heaton et al. | |

FOREIGN PATENT DOCUMENTS

| | | | |
|---|---|---|---|
| 2358399 | 4/1975 | Fed. Rep. of Germany | 409/234 |
| 2076132 | 10/1971 | France | |
| 293500 | 12/1953 | Sweden | |
| 1230213 | 4/1971 | United Kingdom | |

Primary Examiner—Z. R. Bilinsky
Attorney, Agent, or Firm—Lawrence R. Burns; Ira D. Blecker

[57] ABSTRACT

An arrangement and method for mounting a cutter body, especially a milling cutter, in which the cutter and power driven spindle have a common axis of rotation. An arbor shank is used to interconnect the cutter with the spindle with one end of the shank mating with a shouldered bore formed in one of the spindle and cutter. Radially moveable clamp elements are provided to expand and engage the shoulder so as to urge one face of the cutter body into firm abutment with one end of the spindle. Keying means are also provided between the cutter body and the power driven spindle.

9 Claims, 5 Drawing Figures

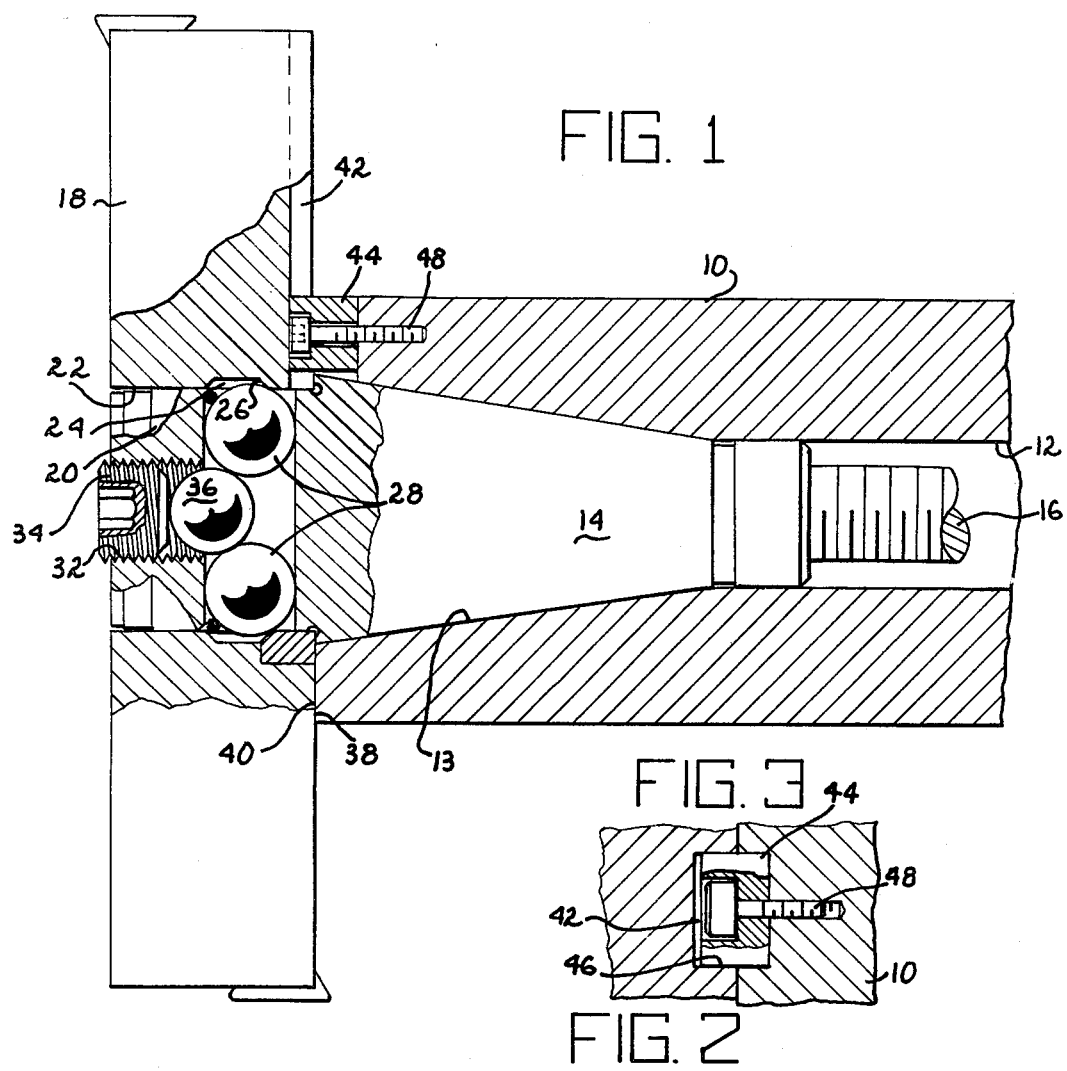
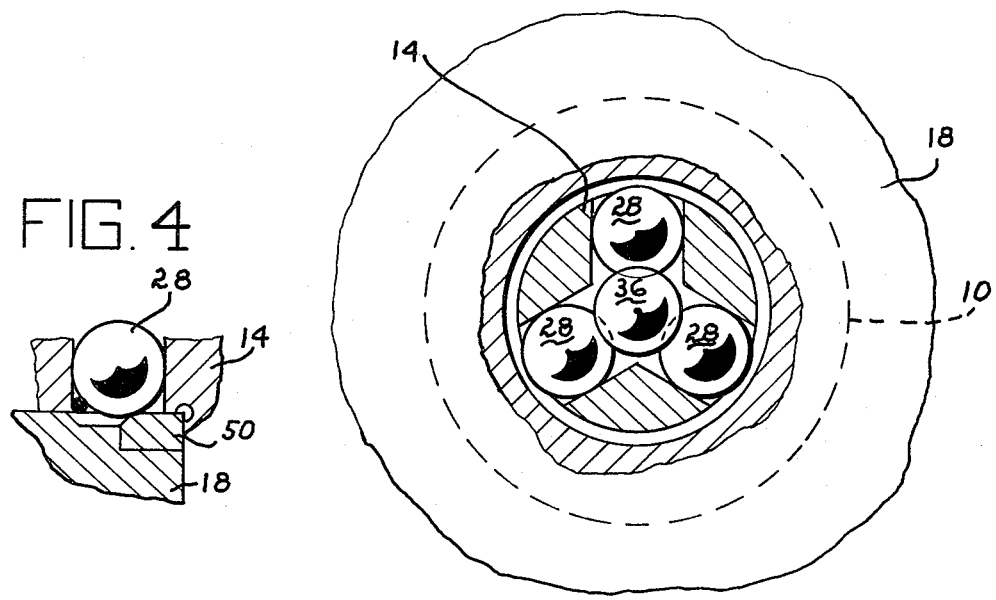

ARRANGEMENT FOR MOUNTING A CUTTER

This is a continuation of application Ser. No. 000,242, filed Jan. 2, 1979, which was a continuation of application Ser. No. 805,916, filed June 13, 1977, now abandoned.

BACKGROUND OF THE INVENTION

This invention relates to milling machine arbors and adaptors therefor and specifically provides for a rigid and accurate mounting arrangement for cutter bodies, especially milling cutters and power driven spindle. An easily operable, quick release mechanism allows the cutter body to be removed and replaced with a minimum of effort and tooling.

Prior art arrangements for mounting milling cutters may be found in *The Machinery's Handbook* and other similar sources. These arrangements usually require the removal of several bolts and the like before removal and replacement of the cutter body can be achieved.

Pertinent to the patentability of the present invention are applicant firm's own patents and applications on tool holders utilizing radially movable clamp elements to achieve a rigid interconnection between tool holders and their supports.

BRIEF SUMMARY OF THE INVENTION

According to the present invention, a shank is provided which interconnects a power driven spindle and a cutter body, and the shank, cutter body and power driven spindle all have a common axis of rotation. Cooperating elements of abutment means and keying means are provided between the spindle and cutter body.

One end of the shank is provided with a perforation, preferably a central axial perforation communicating with radially outwardly extending bores. Carried in the perforation are radially movable clamp elements, preferably ball-like elements, that upon actuation will project beyond the envelope of the shank. A bore having a shoulder is formed in either the power driven spindle or the cutter body and is designed to mate with the one end of the shank carrying the radially outwardly movable clamp elements.

The shoulder of the bore is preferably shaped so that when the radially movable clamp elements engage said shoulder the cooperating elements of abutment means between the cutter body and the spindle are urged into a firm abutting relationship. The other end of the shank which is not carrying the clamp elements is fixedly secured to the other of said spindle and said cutter not having a bore thereon. The other end of said shank may be secured by a tapered drawbar to the power driven spindle or by threadingly engaging an end cap member which holds the cutter body to the shank.

Actuator means are movable axially within the perforation in the shank and preferably comprise a threaded screw element and a ball-like element that may be moved into and out of engagement with said radially movable clamp elements.

The shouldered bore is preferably formed with a ring-like element inserted in the bore with one surface of the ring-like element providing the shoulder in the bore and one end of the ring-like element abutting the one of the other of the cutter or arbor having the bore formed therein.

The exact nature of the present invention will become more clearly apparent upon reference to the following detailed specification taken in connection with the accompanying drawings in which:

FIG. 1 is a side view partly in section showing a milling cutter and spindle according to the present invention with a connecting arbor extending therebetween.

FIG. 2 is a sectional end view of the tool according to FIG. 1.

FIG. 3 is an enlarged view of the key arrangement shown in FIG. 1.

FIG. 4 is a fragmentary view showing a modification.

DETAILED DESCRIPTION OF THE INVENTION

Figure 5:
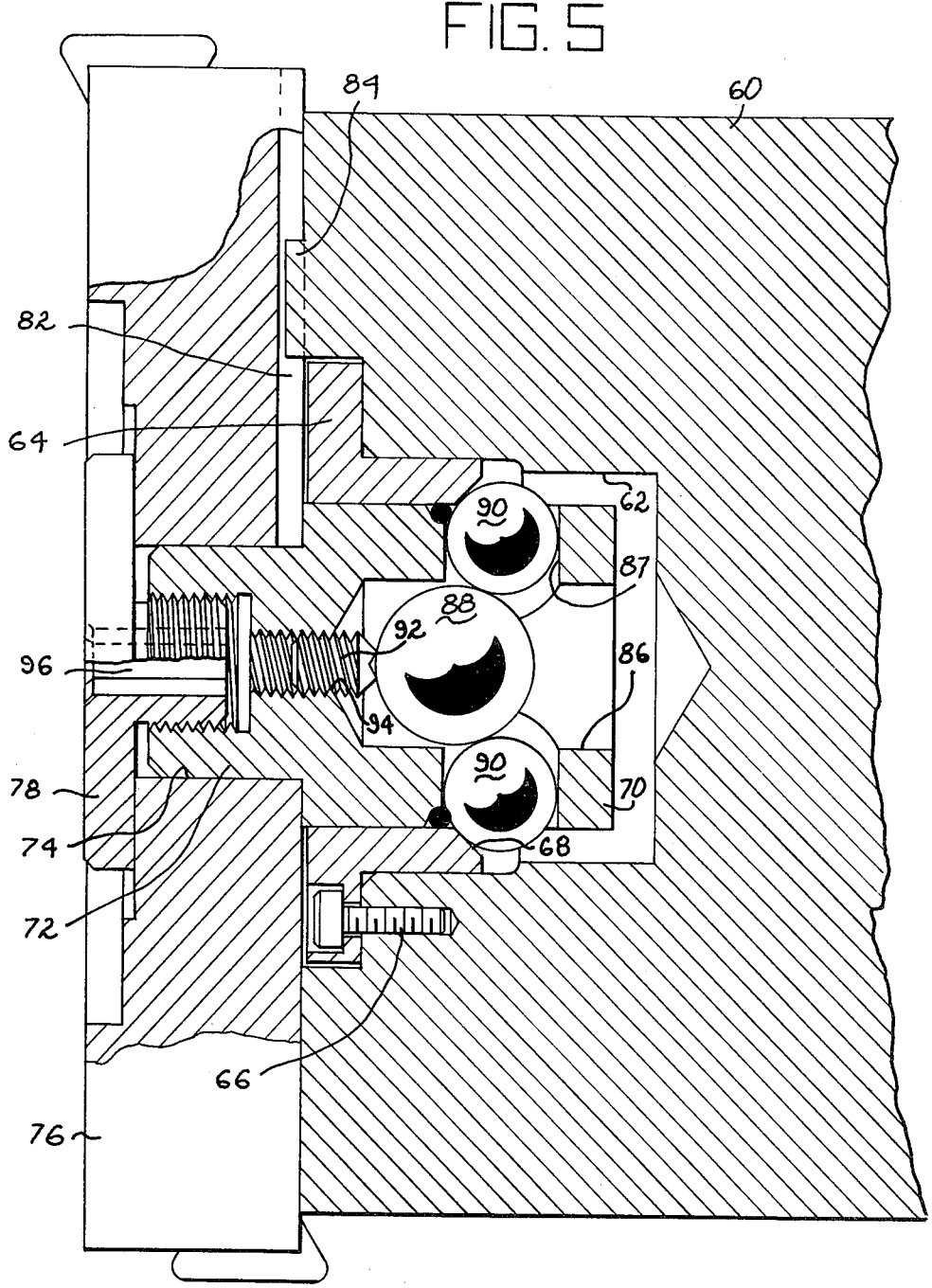
FIG. 5 is a view like FIG. 1 showing a different sort of arbor arrangement.

Referring to the drawings somewhat more in detail, and with particular reference to FIGS. 1 to 4, reference numeral 10 represents a power driven spindle having a central bore 12 terminating in an outwardly tapering portion 13. Tapering portion 13 is adapted for receiving a tapered arbor 14 which, at the end inside spindle 10, is threadedly engaged by drawbar 16.

The other end of arbor 14 projects axially outwardly from the end of spindle 10 and is received in a central hole in cutter body 18 of a milling cutter. The outer end of arbor 14 has a cylindrical portion 20 thereon which is closely receivable inside central bore 22 in body 18.

Body 18 has an annular recess 24 formed therein which includes an inclined shoulder portion 26 engageable by clamp elements 28 in the form of balls located in respective, substantially radial bores 30 formed in the outer end of arbor 14. The arbor includes a threaded axial central perforation 32 within which is threaded a clamp screw 34 that engages the axially movable actuator ball 36 mounted in the bore.

It will be evident that rightward movement of actuator ball 36 will force clamp balls 28 radially outwardly into engagement with shoulder 26 thereby to clamp cutter body 18 fixedly in place with the surface 38 of the cutter body firmly pressed against surface 40 on the end of the arbor.

Rotation of the body 18 on the central axis of arbor 14 and spindle 10, the body may be provided with a keyway 42 while a key 44 is mounted in a notch 46 provided therefor in the end of spindle 10 with the key block being fixed in place by a screw 48.

The arrangement provides for a simple and extremely rapid manner of mounting cutter bodies on spindle 10 and of removing cutter bodies therefrom. No clamp bolts or the like are required and the illustrated arrangement will remain effective over a long period of time.

The shoulder 26 which is engaged by the clamp balls 28 may be provided by a hardened ring 50 mounted in body 18 as shown in FIG. 4. Ring 50 can be fixed to body 18 in any suitable manner in order properly to transfer the clamping loads from clamp balls 28 to cutter body 18.

FIG. 5 shows a modification in which a spindle 60 has a central bore 62 therein with a ring, advantageously of hardened steel, 64 mounted in the outer end of the bore and clamped therein as by clamp screw 66. Ring 64 has an inclined shoulder 68 formed on the inner end and internally is of a size to receive and closely embrace a shank 70 which has an axially outer end 72 fitted in a central bore 74 in a cutter body 76. A tubular clamp bolt end cap 78 threads into the outer end of arbor 70 and clamps the cutter body against shoulder 80 formed on arbor 70.

The body 76 may include a keyway 82 into which a key 84 fixed on spindle 60 extends to hold cutter body 76 against rotation on the spindle.

Shank 70 has a central bore 86 which receives an actuator ball 88 and which central bore is intersected by radial bores 87 each having a clamp ball 90 therein engageable with shoulder 68 when actuator ball 88 is moved to the right. Movement of the actuator ball is accomplished by a screw 92 mounted in a threaded bore 94 in arbor 70 and the outer end of which is accessible through the central bore 96 in clamp screw end cap 78 in which central bore may, to advantage, be configured to receive a drive wrench for rotation of clamp screw end cap 78 which may also receive a wrench for turning clamp screw end cap 78.

Modifications may be made within the scope of the appended claims.

What is claimed is:

1. An arrangement for mounting on a power driven spindle, comprising: a milling cutter, a shank rigidly connecting said cutter and spindle, said cutter, shank and spindle having a common axis of rotation, but said shank and cutter are separate components not threadedly engaged with one another, cooperating elements of abutment means and cooperating elements of keying means between said spindle and said cutter, a bore in said spindle, a shoulder formed on said bore, radially movable clamp elements are mounted in radially outwardly extending bores foremd on one end of said shank, a central axial perforation is formed in said one end of said shank and communicates with said radially outwardly extending bores having said clamp elements located therein, actuator means located and axially movable within said perforation, and an end cap having a central axial bore communicating with said actuator means on the other end of said shank, said central axial bore being coincident with the direction of axial movement of said actuator means, said clamp elements movable radially outwardly so as to abuttingly engage said shoulder on said bore and urge said cooperating elements of abutment means into engagement by drawing said end cap against said cutter.

2. The arrangement according to claim 1 in which at least one of said clamp elements and said shoulder have abutment surfaces that converge toward said cooperating elements of abutment means.

3. The arrangement according to claim 2 in which said shoulder has surfaces which converge toward said cooperating elements of abutment means and said clamp elements have curved surfaces for engagement with said shoulder.

4. The arrangement according to claim 3 wherein said clamp elements have spherical surfaces to engage said shoulder.

5. The arrangement according to claim 4 wherein said clamp elements are comprised of metal balls having a first diameter and said actuator means are comprised of a threaded screw element and a metal ball having a diameter larger than said first diameter.

6. The arrangement according to claim 1 in which said bore and shoulder are comprised of a bore of one given dimension and a tubular ring, having an outside dimension approximately equal to said one given dimension, interfitted in said bore and having said shoulder formed on one end thereof.

7. The arrangement according to claim 1 wherein said end cap is threadingly engaged to said shank.

8. An arrangement for mounting a cutter body, comprising: a power driven spindle, a shank releasably connected to said spindle, said cutter, shank and spindle having a common axis of rotation, but said shank and cutter are separate components not to be threadedly engaged with one another, a bore in said spindle, a shoulder formed on said bore, radially movable clamp elements mounted in radially outwardly extending bores formed on said shank, a central axial perforation is formed in said one end of said shank and communicates with said radially outwardly extending bores having said clamp elements located therein, actuator means located and axially movable within said perforation, an end cap having a central axial bore communicating with said actuator means on the other end of said shank, said central axial bore being coincident with the direction of axial movement of said actuator means, said clamp elements movable radially outwardly so as to abuttingly engage said shoulder on said bore.

9. The arrangement according to claim 8 wherein said end cap is threadingly engaged to said shank.

* * * * *